(12) United States Patent
Chiang

(10) Patent No.: US 8,212,929 B2
(45) Date of Patent: Jul. 3, 2012

(54) IMAGE PROCESSING METHOD AND COMPUTER READABLE MEDIUM

(75) Inventor: Jia-Jie Chiang, Linkou Township, Taipei County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1143 days.

(21) Appl. No.: 12/076,318

(22) Filed: Mar. 17, 2008

(65) Prior Publication Data

US 2009/0066841 A1    Mar. 12, 2009

(30) Foreign Application Priority Data

Sep. 12, 2007   (TW) ................................ 96134112 A

(51) Int. Cl.
*H04N 9/74* (2006.01)
(52) U.S. Cl. ................ 348/586; 345/628; 345/640
(58) Field of Classification Search .................. 348/586
See application file for complete search history.

(56) References Cited

U.S. PATENT DOCUMENTS

| | | | |
|---|---|---|---|
| 4,758,892 A * | 7/1988 | Bloomfield | 348/585 |
| 4,808,984 A * | 2/1989 | Trueblood et al. | 345/214 |
| 4,855,831 A * | 8/1989 | Miyamoto et al. | 348/597 |
| 4,992,780 A * | 2/1991 | Penna et al. | 345/422 |
| 5,140,416 A * | 8/1992 | Tinkler | 348/33 |
| 5,241,372 A * | 8/1993 | Ohba | 348/578 |
| 5,313,275 A * | 5/1994 | Daly et al. | 348/592 |
| 5,444,835 A * | 8/1995 | Turkowski | 345/592 |
| 5,488,674 A * | 1/1996 | Burt et al. | 382/284 |
| 5,630,037 A * | 5/1997 | Schindler | 345/592 |
| 5,812,214 A * | 9/1998 | Miller | 348/587 |
| 5,812,787 A * | 9/1998 | Astle | 709/247 |
| 5,870,103 A * | 2/1999 | Luo | 345/630 |
| 6,137,919 A * | 10/2000 | Gonsalves et al. | 382/284 |
| 6,157,387 A * | 12/2000 | Kotani | 345/589 |
| 6,249,613 B1* | 6/2001 | Crinon et al. | 382/236 |
| 6,288,703 B1* | 9/2001 | Berman et al. | 345/600 |
| 6,771,834 B1* | 8/2004 | Martins et al. | 382/257 |
| 6,909,438 B1* | 6/2005 | White et al. | 345/629 |
| 6,977,664 B1* | 12/2005 | Jinzenji et al. | 345/629 |
| 7,024,050 B2* | 4/2006 | Kondo et al. | 382/254 |
| 7,221,778 B2* | 5/2007 | Kondo et al. | 382/107 |
| 7,536,049 B2* | 5/2009 | Kondo et al. | 382/173 |
| 2004/0062450 A1* | 4/2004 | Kondo et al. | 382/266 |

FOREIGN PATENT DOCUMENTS

JP             06110432 A   *   4/1994

* cited by examiner

*Primary Examiner* — Kieu Oanh T Bui
*Assistant Examiner* — Fernando Alcon
(74) *Attorney, Agent, or Firm* — Rabin & Berdo, P.C.

(57) ABSTRACT

An image processing method includes the following steps. Firstly, foreground image data and background image data are received, wherein the foreground and the background image data corresponds to the same pixel in a display panel. Then, a foreground ratio and a background ratio are determined in response to an operational event. Next, a first value is obtained by multiplying the foreground image data by the foreground ratio, and a second value is obtained by multiplying the background image data by the background ratio. Then, an output image data is obtained by adding the first value and the second value. After that, the output image data is displayed at the pixel in the display panel.

20 Claims, 6 Drawing Sheets

IMAGE PROCESSING METHOD AND COMPUTER READABLE MEDIUM

This application claims the benefit of Republic of Taiwan application Serial No. 096134112, filed Sep. 12, 2007, the subject matter of which is incorporated herein by reference.

BACKGROUND OF THE INVENTION

1. Field of the Invention

The invention relates in general to an image processing method, and more particularly to an image processing method for fading and overlapping image.

2. Description of the Related Art

With the advance in science and technology, the technology of concurrently displaying several image frames in a display device is already available. According to conventional technology, several image frames are displayed by overlapping one another. For example, in a conventional monitor system, one of several monitor frames is displayed in a display device as a background image frame and other monitor frames are used as foreground image frames which cover the background image frame so that all monitor frames are displayed at the same time.

However, in the conventional technology disclosed above, the part of the background image frame covered by the foreground image frame will not be effectively displayed. Therefore, in practical application, the area of the foreground image frame will be limited lest the background image frame has a large portion covered by the foreground image frame resulting in poor display effect. The above restriction will make the display effect of the foreground image frame poor due to a small-sized frame. Therefore, how to design an image processing technology capable of effectively displaying both the foreground image frame and the background image frame has become an imminent issue to be resolved.

SUMMARY OF THE INVENTION

The invention is directed to an image processing method for a fading and overlapping image is provided. Compared with the conventional method of displaying several image frames in a display device, the method of the invention flexibly makes the foreground image frame and the part of the background image frame overlapped with the foreground image frame semi-transparent, so that both the part of the background image frame overlapped with the foreground image frame and the foreground frame can be effectively displayed.

According to a first aspect of the present invention, an image processing method is provided. The method includes the following steps. Firstly, a foreground image data and a background image data are received, wherein the foreground image data and the background image data both correspond to the same pixel in a display panel. Next, the foreground ratio and the background ratio are determined in response to an operational event. Then, a first value is obtained by multiplying the foreground ratio by the foreground image data, and a second value is obtained by multiplying the background ratio by the background image data. Afterwards, an output image data is obtained by adding the first value and the second value. After that, the output image data is displayed at the pixel in the display panel.

According to a second aspect of the present invention, a computer readable medium used in a computer system is provided. The computer system includes a processor which accesses computer readable medium for performing an image processing method. The method includes the following steps. Firstly, a foreground image data and a background image data are received, wherein the foreground image data and the background image data both correspond to the same pixel in a display panel. Next, the foreground ratio and the background ratio are determined in response to an operational event. Then, a first value is obtained by multiplying the foreground ratio by the foreground image data, and a second value is obtained by multiplying the background ratio by the background image data. Afterwards, an output image data is obtained by adding the first value and the second value. After that, the output image data is displayed at the pixel in the display panel.

The invention will become apparent from the following detailed description of the preferred but non-limiting embodiments. The following description is made with reference to the accompanying drawings.

DETAILED DESCRIPTION OF THE INVENTION

The image processing method of the present embodiment of the invention adjusts and adds the weights of several image frame data to generate an output image frame data for displaying several image frames with fading and overlapping effect.

Figure 1:
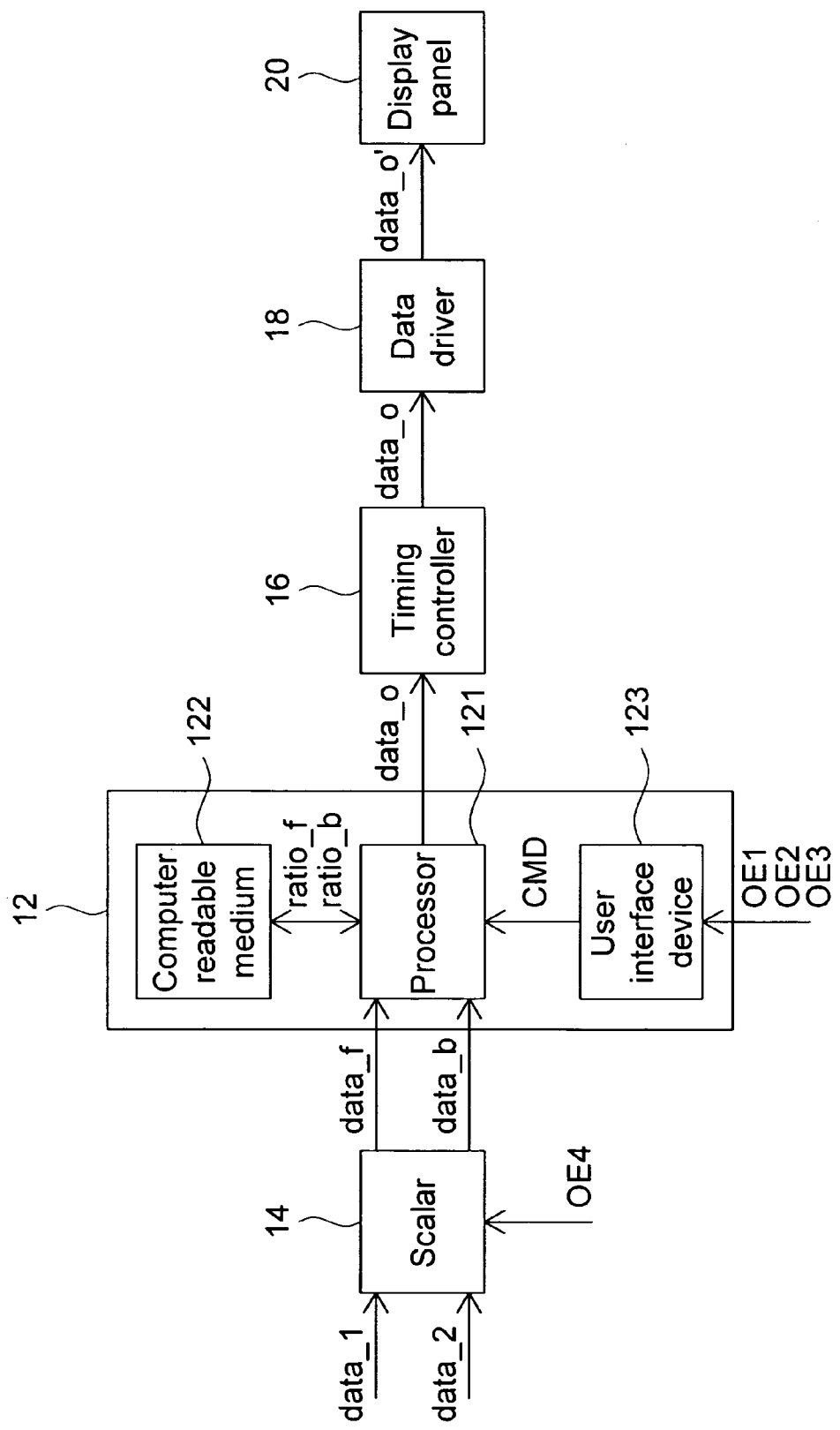
FIG. 1 is a partial block diagram of a display device using an image processing method of the present embodiment of the invention.

Referring to FIG. 1, a partial block diagram of a display device using the image processing method of the present embodiment of the invention is shown. The computer system 12 includes a processor 121, a computer readable medium 122 and a user interface device 123. The computer readable medium 122 is for storing instruction code capable of being performed to complete the image processing method of the present embodiment of the invention. The user interface device 123 is for providing a received control command CMD to the processor 121 in response to an operational event (OE). The processor 121 reads the instruction code from the computer readable medium 122 and executes the image processing method of the present embodiment of the invention according to the control command CMD, data or parameter (not illustrated) inputted by the user.

The computer system 12 performs image processing on a foreground image data data_f and a background image data data_b provided by a scalar 14 and output the processed image data (i.e. output image data data_o) to the timing controller 16. The timing controller 16 then outputs the output image data data_o to a data driver 18, which generates and outputs an image data data_o' corresponding to the output image data data_o to the display panel 20 and displays an image frame thereon.

Figure 2:
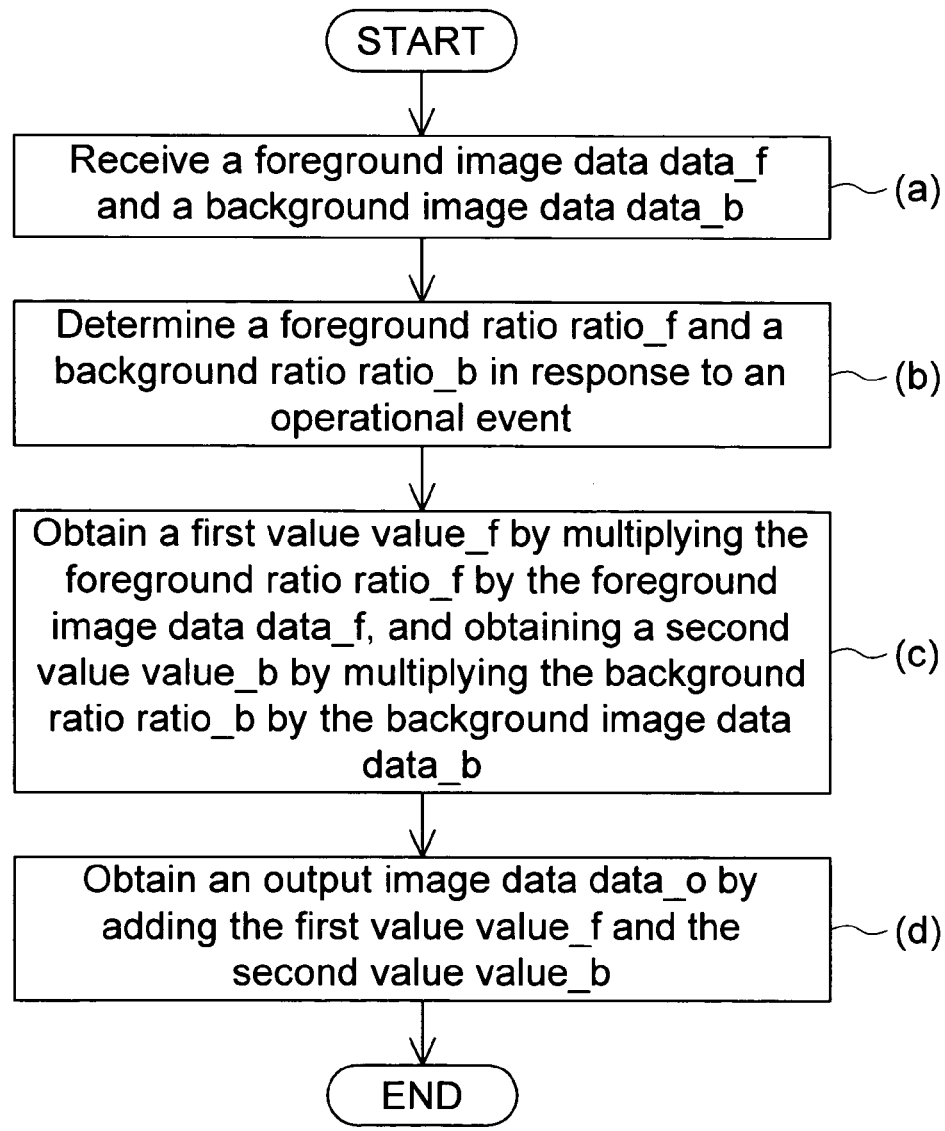
FIG. 2 is a flowchart of an image processing method for fading and overlapping an image according to an embodiment of the invention.
Figure 3A:
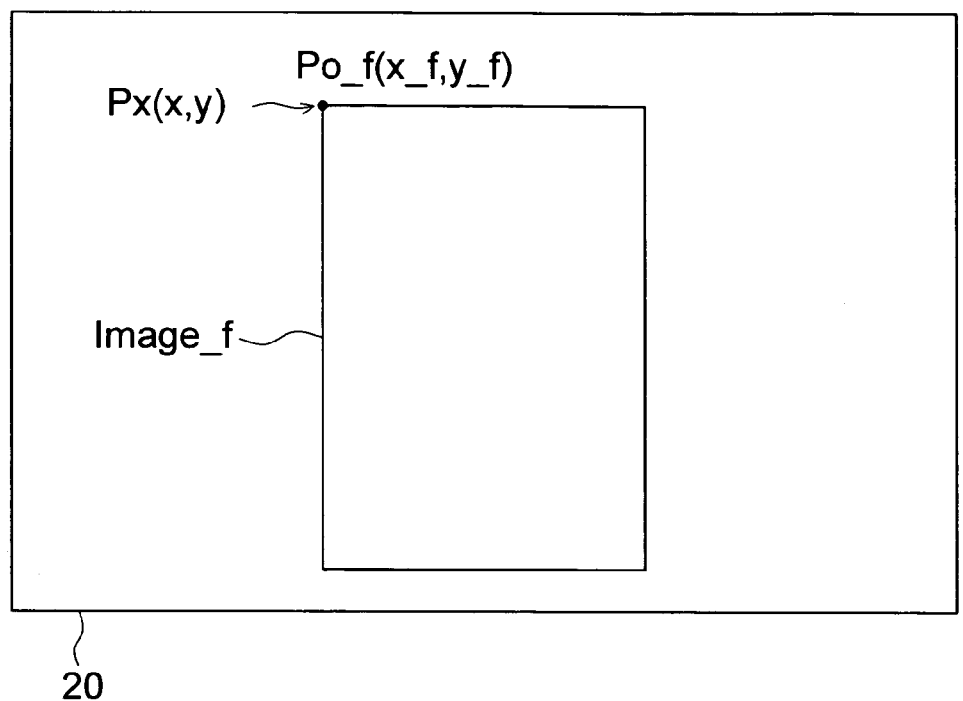
FIG. 3A is a perspective of a foreground image frame.
Figure 3B:
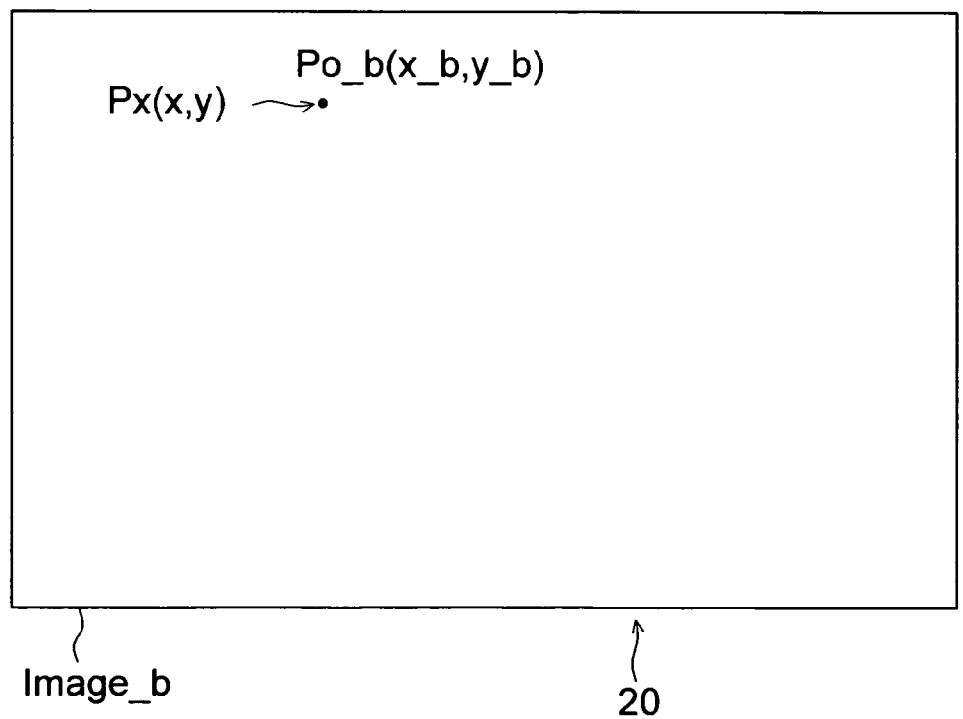
FIG. 3B is a perspective of a background image frame.

Referring to both FIG. 1 and FIG. 2. FIG. 2 is a flowchart of an image processing method for fading and overlapping an image according to an embodiment of the invention. Firstly, the method begins at step (a), a foreground image data data_f and a background image data data_b are provided by a scalar 14 to a processor 121. The foreground image data data_f, for example, shows an image point at position Po_f (x_f,y_f) of a foreground image frame image_f as indicated in FIG. 3A. The background image data data_b, for example, show an image point at position Po_b (x_b,y_b) of a background image frame image_b as indicated in FIG. 3B. The image points Po_f (x_f, y_f) and Po_b (x_b, y_b) are displayed by the same pixel Px (x, y) or at the same position in the display panel 20.

Next, the method proceeds to step (b), a control command CMD is generated by the user interface device 123 in response to an operational event, and the values of the foreground ratio_f and the background ratio ratio_b are determined by the processor 121 in response to the control command CMD. The user interface device 123 is, for example, a control panel, via which the user activates at least one operational event to generate a corresponding control command CMD. For example, when the user touches the control panel to activate an operational event OE1 for automatically fading an image, the operational event OE1 is translated to generate a control command CMD and then the processor 121, in response to the corresponding control command CMD, locates the foreground ratio_f and the background ratio_b by looking up a look-up table.

Figure 4:
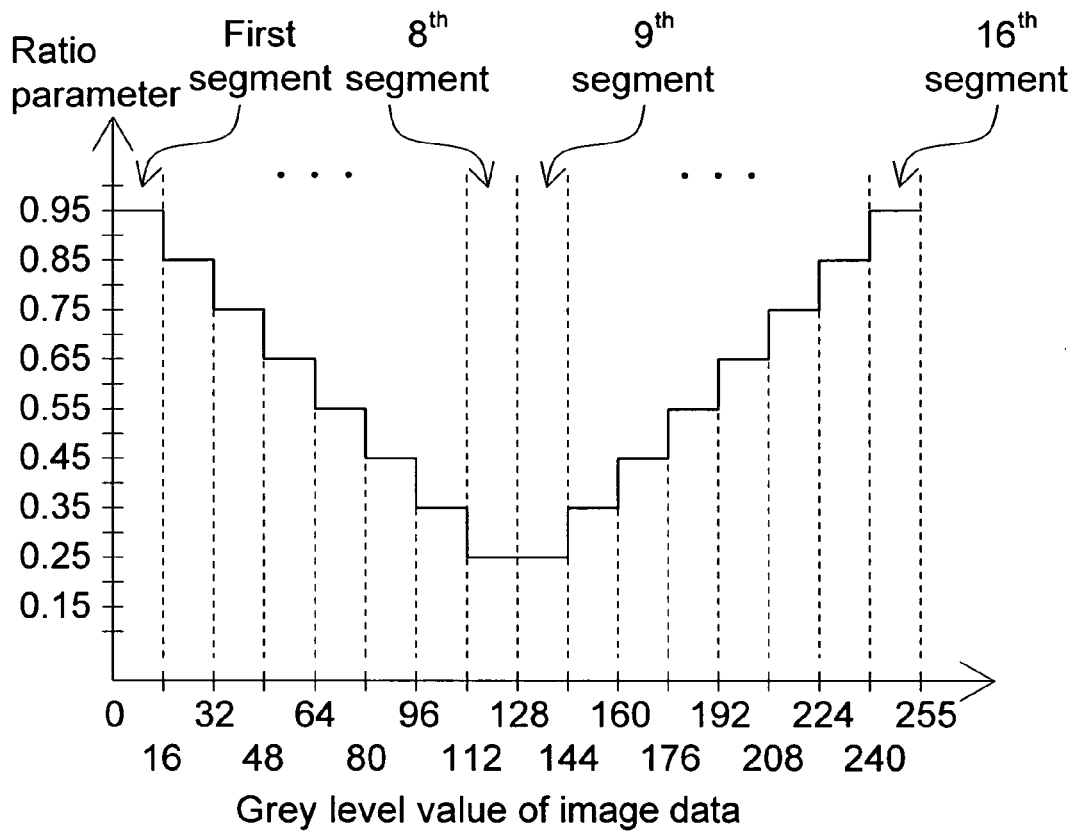
FIG. 4 is a perspective of a look-up table stored in a computer readable medium.

The computer readable medium 122 has a look-up table for mapping the ratio parameters corresponding to the image data as indicated in FIG. 4. The maximum value and the minimum value of the image data are, for example, respectively equal to gray level value 255 and 0. From gray level value 0 upwards, every continuous 16 gray level values form a segment such that totally 16 segments are formed from gray level value 0 to 255. In the look-up table, the gray level values of each segment correspond to a ratio parameter. If the gray level value of an image data falls within from the 8th to the 1st segment, the corresponding ratios are respectively equal to 0.25, 0.35, 0.45, 0.55, 0.65, 0.75, 0.85, and 0.95. If the gray level value falls within from the 9th to the 16th segment, the corresponding ratio are respectively equal to 0.25, 0.35, 0.45, 0.55, 0.65, 0.75, 0.85 and 0.95. Thus, the processor 121 can obtain the corresponding foreground ratio_f and the background ratio ratio_b according to the foreground image data data_f and the background image data_b respectively according to the look-up table from the computer readable medium 122.

Then, the method proceeds to step (c), the processor 121 respectively obtains the value value_f and the value value_b according to the formulas below:

$$value\_f = data\_f \times ratio\_f$$

$$value\_b = data\_b \times ratio\_b$$

That is, the processor 121 obtains the value value_f by multiplying the foreground ratio_f by the foreground image data data_f and obtaining the value value_b by multiplying the background ratio_b by the background image data data_b. Afterwards, the method proceeds to step (d), the processor 121 obtains the output image data data_o according to the formulas below:

$$data\_o = value\_f + value\_b$$

That is, the processor 121 obtains the output image data data_o by adding the value value_f and the value value_b. After that, the processor 121 outputs the output image data data_o to a data driver 18 via a timing controller 16; the data driver 18 correspondingly outputs an image data data_o' to the pixel Px (x, y) in the display panel 20. Thus, the foreground background image data data_f and the background image data data_b are automatically faded and displayed in the display panel 20.

The foreground image data data_f and the background image data data_b are, for example, red component of image data with (RGB) data format. Thus, according to the above image processing method, the automatically faded image points Po_f (x_f,y_f) and Po_b (x_b,y_b) are displayed in the red component of the pixel Px (x,y). All image data at other position of the foreground image frame image_f overlapping the background image frame image_b can also be processed according to the above data processing method, so that the foreground image frame image_f and the background image frame image_b are automatically faded. For example, Accompanied Drawing 1 and Accompanied Drawing 2 represent the background image frame image_b and the foreground image frame image_f respectively, and the image effect of automatic fading is indicated in Accompanied Drawing 3.

Figure 5:
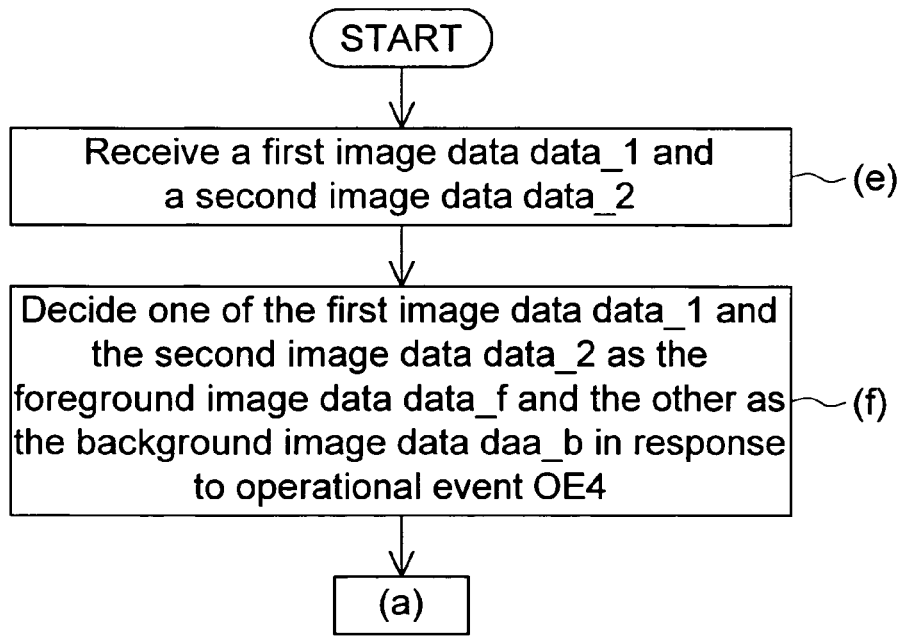
FIG. 5 is a partial flowchart of the image processing method according to the present embodiment of the invention.

Referring to both FIG. 1 and FIG. 5. FIG. 5 is a partial flowchart of the image processing method according to the present embodiment of the invention is shown. Steps (e) and (f) of FIG. 5 are performed prior to step (a) of FIG. 2. In step (e), two image data data_1 and data_2, respectively outputted from a first signal source and a second signal source (not illustrated), are received by the scalar 14. For example, the first signal source is from TV, and the second signal source is from web camera. Next, in step (f), in response to an operational event OE4, the scalar 14 decides one of the image data data_1 and the image data data_2 as the foreground image data data_f and the other as the background image data data_b, and determines the corresponding displaying position of the foreground image data data_f and the background image data data_b in the display panel 20. For example, the scalar 14 decides the image data data_1 and data_2 as the background image data data_b and the foreground image data_f, respectively.

Figure 6:
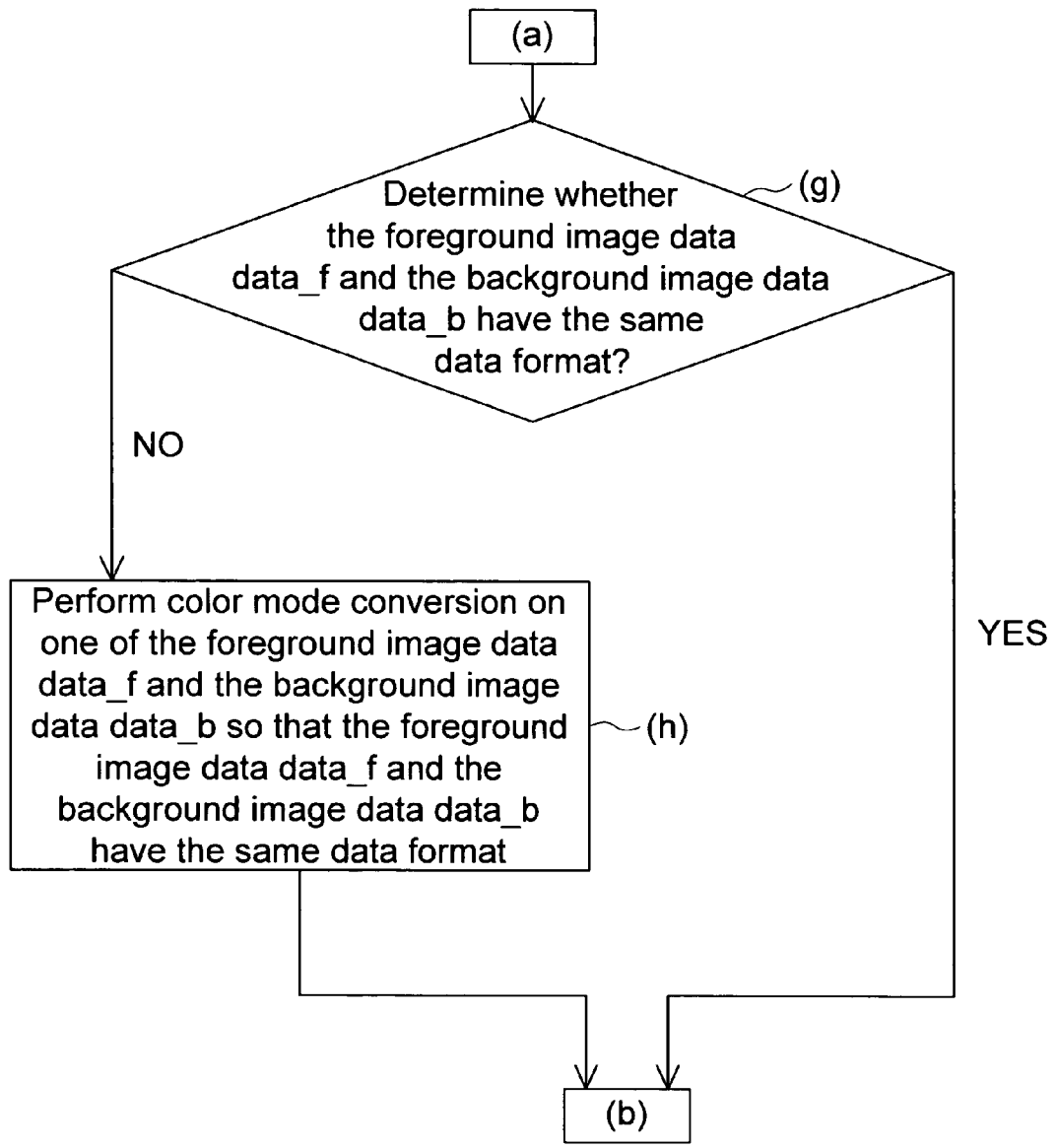
FIG. 6 is another partial flowchart of the image processing method according to the present embodiment of the invention.

Referring to FIG. 6, another partial flowchart of the image processing method according to the present embodiment of the invention is shown. Between step (a) and step (b), the method further includes steps (g) and (h). In step (g), the processor 121 determines whether the foreground image data data_f and the background image data data_b have the same data format, for example, both have RGB data format or luminance chrominance (YUV) data format. If the foreground image data data_f and the background image data data_b both have, for example, the RGB data format, then step (b) is directly performed.

If the foreground image data data_f and the background image data data_b do not have the same data format, then step (h) is performed, the processor 121 performs color mode conversion to one of the foreground image data data_f and the background image data data_b so that the foreground image data data_f and the background image data data_b have the same data format. Thus, the processor 121 can perform image processing to the foreground image data data_f and the background image data data_b having the same data format.

In practical application, if the foreground image data data_f and the background image data data_b have different data formats, the processor 121 converts the foreground image data data_f and the background image data data_b into the image data with RGB data format. In another practical application, if the foreground image data data_f and the background image data data_b do not have RGB data format, the processor 121 converts the foreground image data data_f and the background image data data_b into image data with RGB image data format, and performs image processing to the red/green/blue component respectively.

In the present embodiment of the invention, the user activates the automatic fading operational event OE1. However, the computer system 12 of the present embodiment of the invention can perform different operations in response to other operational events. For example, when the user activates the overlapping operational event OE2 via the control panel (referring to FIG. 1), the processor 121, in response to the corresponding control command CMD, sets the foreground ratio_f and the background ratio_b as 1 and 0 respectively. Thus, the value value_f and value_b are substantially equal to the foreground image data data_f and 0 respectively, so that the output image data data_o is substantially equal to the foreground image data data_f. Besides, all image data at other position of the foreground image frame image_f overlapping the background image frame image_b can also be processed according to the above data processing method to obtain the overlapping effect. For example, Accompanied Drawing 1 and the Accompanied Drawing 2 represent the background image frame image_b and the foreground image frame image_f respectively and the overlapping effect is indicated in Accompanied Drawing 4.

When the user activates the manual fading operational event OE3 (referring to FIG. 1) via the control panel, the processor 121 receives a user-defined data (not illustrated), which can be can be inputted via the control panel, and determines the values of the parameter ratio_f and the parameter ratio_b according to the user-defined data. Besides, the user also can input the values of the parameter ratio_f and the parameter ratio_b directly through the control panel. Thus, the image processing method of the present embodiment of the invention can perform manual fading processing according to the foreground ratio_f and the background ratio_b designated by the user.

In the present embodiment of the invention, the look-up table includes the corresponding relationship between the ratio and the image data as shown in FIG. 4, however the look-up table of the present embodiment of the invention is not limited to the corresponding relationship indicated in FIG. 4 and can be further adjusted. For example, the segment can be more accurate to map the gray level value of the image data to the corresponding ratio parameter. In another example, the value of the ratio parameter is reduced to be a half of the original value 0.25~0.95 illustrated in FIG. 4, that is, correspondingly reduced to 0.125~0.475. As a result, the maximum value of the sum of the foreground ratio_f and the background ratio_b obtained according to the foreground image data data_f and the background image data data_b is still less than 1. Thus, the maximum value of the output image data data_o will not exceed the maximum gray level value (255) of the image data.

Figure 7:
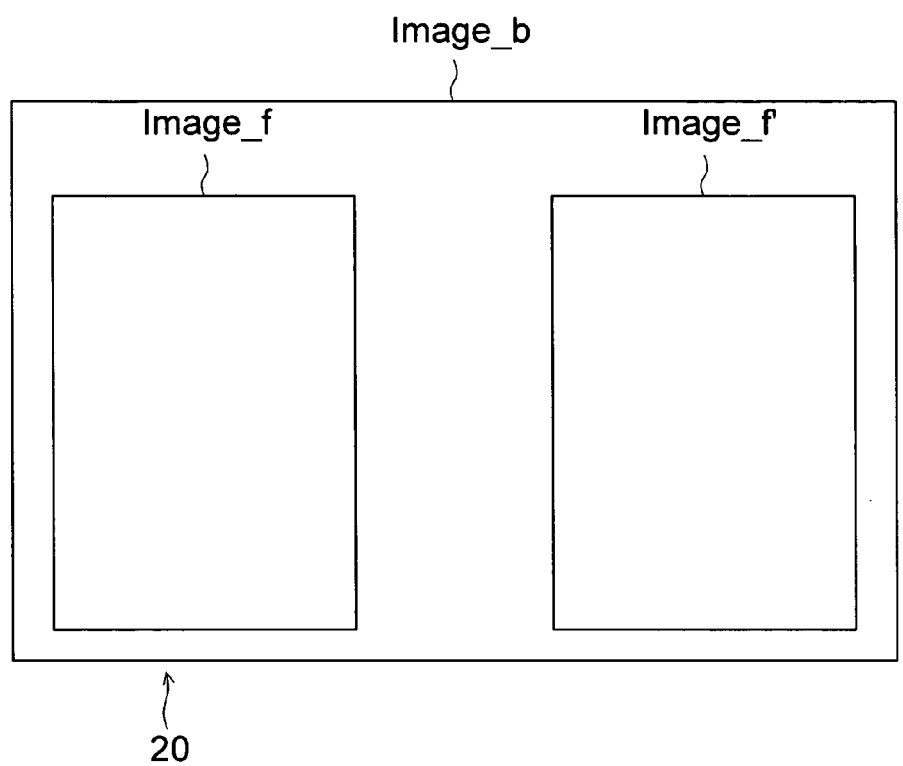
FIG. 7 is a perspective of a background image frame and two foreground image frames.

In the present embodiment of the invention, only a foreground image frame image_f and a background image frame image_b are displayed in the display panel 20 according to the image processing method. However, the image processing method of the present embodiment of the invention can display three image frames or more in the display panel 20. For example, the scalar 14 can set another image frame as a foreground image data image_f', then displays the foreground image frames image_f and image_f' on the background image frame image_b with fading effect as indicated in FIG. 7. Therefore, the image processing method of the present embodiment of the invention substantially can display three image frames.

In the present embodiment of the invention, the user interface device 123 is exemplified by a control panel but is not limited thereto. For example, other user interface devices can be used to generate a corresponding control command CMD in response to the operational event activated by the user.

According to the image processing method of the present embodiment of the invention, three different methods can be used to adjust flexibly the weights of several image frame data, and output the weighted image frame data accordingly, so that the foreground image frame and the background image frame can be displayed with fading effect. Compared with the conventional technology of displaying several image frames in a display device, the image processing method of the present embodiment of the invention flexibly makes the foreground image frame and the part of the background image frame overlapped with the foreground image frame semi-transparent, so that both the part of the background image frame overlapped with the foreground image frame and the foreground frame can be effectively displayed.

Furthermore, the image processing method of the present embodiment of the invention can achieve different fading effect and overlapping effect by adjusting the ratio parameters.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method, comprising:
   (a) receiving a foreground image data and a background image data, wherein the foreground image data and the background image data both correspond to the same pixel in a display panel;
   (b) determining a foreground ratio and a background ratio in response to an operational event;
   (c) obtaining a first value by multiplying the foreground ratio by the foreground image data, and obtaining a second value by multiplying the background ratio by the background image data; and
   (d) obtaining an output image data by adding the first value and the second value, and displaying the output image data at the pixel in the display panel;
   wherein one of the foreground image data and the background image data is indicative of a gray level that ranges from a minimum value to a maximum value from which 2N segments are formed;
   wherein when the gray level of said one of the foreground image data and the background image changes from being within an $N^{th}$ segment to being within a $1^{st}$ segment, said one of the foreground ratio and the background ratio is gradually increased; and
   wherein when the gray level of said one of the foreground image data and the background image changes from being within a $(N+1)^{th}$ segment to a $2N^{th}$ segment, said one of the foreground ratio or the background ratio is gradually increased.

2. The image processing method according to claim 1, wherein the step (b) further comprises:
  providing a look-up table for locating the foreground ratio and the background ratio corresponding to the foreground image data and the background image data respectively.

3. The image processing method according to claim 1, wherein the step (b) further comprises:
  setting the foreground ratio and the background ratio as 1 and 0 respectively.

4. The image processing method according to claim 1, wherein the step (b) further comprises:
  receiving a first input parameter and a second input parameter and setting the foreground ratio and the background ratio as the first input parameter and the second input parameter respectively.

5. The image processing method according to claim 1, wherein the sum of the maximum value of the foreground ratio and the maximum value of the background ratio is less than or equal to 1.

6. The image processing method according to claim 1, wherein prior to the step (a), the method further comprises:
  (e) receiving a first image data and a second image data; and
  (f) deciding one of the first image data and the second image data as the foreground image data and the other as the background image data.

7. The image processing method according to claim 1, further comprising:
  (g) determining whether the foreground image data and the background image data have the same data format;
  wherein the step (b) is performed directly if the first image data and the second image data have the same data format.

8. The image processing method according to claim 7, wherein if the first image data and the second image data have different data format, perform the following step:
  (h) performing color mode conversion on a selected one of the foreground image data and the background image data so that the foreground image data and the background image data have the same data format.

9. The image processing method according to claim 8, wherein after the step (h), the foreground image data and the background image data have a red/green/blue (RGB) data format.

10. The image processing method according to claim 2, wherein
  the foreground image data and the background image data are luminance data of a luminance chrominance (YUV) data format; and
  the look-up table maps the luminance data of the foreground image data and the background image data to the foreground ratio and the background ratio respectively.

11. A non-transitory computer readable medium used in a computer system, wherein the computer system comprises a processor which accesses the non-transitory computer readable medium for performing an image processing method, the image processing method comprising:
  (a) obtaining a foreground image data and a background image data, wherein the foreground image data and the background image data both correspond to the same pixel in a display panel;
  (b) determining a foreground ratio and a background ratio in response to an operational event;
  (c) obtaining a first value multiplying the foreground ratio by the foreground image data, and obtaining a second value by multiplying the background ratio by the background image data; and
  (d) obtaining an output image data by adding the first value and the second value and displaying the output image data at the pixel in the display panel;
  wherein one of the foreground image data and the background image data is indicative of a gray level that ranges from a minimum value to a maximum value from which 2N segments are formed;
  wherein when the gray level of said one of the foreground image data and the background image changes from being within an $N^{th}$ segment to being within a $1^{st}$ segment, said one of the foreground ratio and the background ratio is gradually increased; and
  wherein when the gray level of said one of the foreground image data and the background image changes from being within an $(N+1)^{th}$ segment to being within a $2N^{th}$ segment, said one of the foreground ratio and the background ratio is gradually increased.

12. The computer readable medium according to claim 11, wherein the step (b) of the image processing method further comprises:
  providing a look-up table for locating the foreground ratio and the background ratio corresponding to the foreground image data and the background image data.

13. The computer readable medium according to claim 11, wherein the step (b) of the image processing method further comprises:
  setting the foreground ratio and the background ratio as 1 and 0 respectively.

14. The computer readable medium according to claim 11, wherein the step (b) of the image processing method further comprises:
  receiving a first input parameter and a second input parameter and setting the foreground ratio and the background ratio as the first input parameter and the second input parameter respectively.

15. The computer readable medium according to claim 11, wherein the sum of the maximum value of the foreground ratio and the maximum value of the background ratio is less than or equal to 1.

16. The computer readable medium according to claim 11, wherein prior to the step (a), the image processing method further comprises:
  (e) receiving a first image data and a second image data; and
  (f) deciding one of the first image data and the second image data as the foreground image data and the other as the background image data.

17. The computer readable medium according to claim 11, wherein the image processing method further comprises:
  (g) determining whether the foreground image data and the background image data have the same data format;
  wherein the step (b) is performed directly if the first image data and the second image data have the same data format.

18. The computer readable medium according to claim 17, wherein if the first image data and the second image data have different data format, the image processing method further perform the following step:
  (h) performing color mode conversion on a selected one of the foreground image data and the background image data so that the foreground image data and the background image data have the same data format.

19. The computer readable medium according to claim 18, wherein after the step (h) of the image processing method, the foreground image data and the background image data have a red/green/blue (RGB) data format.

20. The computer readable medium according to claim 12, wherein the foreground image data and the background image data are luminance data of a luminance chrominance (YUV) data format; and the look-up table respectively maps the luminance data of the foreground image data and the background image data to the foreground ratio and the background ratio respectively.

* * * * *